United States Patent [19]

Lorence et al.

[11] Patent Number: 4,955,571
[45] Date of Patent: Sep. 11, 1990

[54] DUAL ACTION CUPHOLDER

[75] Inventors: Brian S. Lorence, Warren; Richard A. Phelps, Ferndale, both of Mich.

[73] Assignee: Chivas Products Limited, Sterling Heights, Mich.

[21] Appl. No.: 437,252

[22] Filed: Nov. 21, 1989

[51] Int. Cl.⁵ .................................................. A47K 1/09
[52] U.S. Cl. .................................................... 248/311.2
[58] Field of Search .................. 248/311.2, 314, 315; 297/188, 194

[56] References Cited

U.S. PATENT DOCUMENTS

| | | | |
|---|---|---|---|
| 1,894,146 | 1/1933 | Baker | 248/311.2 |
| 2,526,793 | 10/1950 | Alfred . | |
| 2,574,250 | 11/1951 | Dalton . | |
| 2,648,516 | 8/1953 | Manetti | 248/311.2 |
| 3,338,629 | 8/1967 | Drees . | |
| 3,606,112 | 9/1971 | Cheshier . | |
| 3,637,184 | 1/1972 | O'Brien | 248/311.2 |
| 3,784,142 | 1/1974 | O'Brien | 248/311.2 |
| 4,040,659 | 8/1977 | Arnold . | |
| 4,099,470 | 7/1978 | Cannon | 248/311.2 |
| 4,417,764 | 11/1983 | Marens et al. . | |
| 4,453,759 | 6/1984 | Kathiria . | |
| 4,645,157 | 2/1987 | Parker | 248/311.2 |
| 4,733,908 | 3/1988 | Dykstra et al. . | |
| 4,738,423 | 4/1988 | DiFilippo et al. . | |
| 4,783,037 | 11/1988 | Flowerday . | |
| 4,826,058 | 5/1989 | Nakayama . | |
| 4,854,536 | 8/1989 | Lorence et al. . | |

*Primary Examiner*—Reinaldo P. Machado
*Attorney, Agent, or Firm*—Townsend and Townsend

[57] ABSTRACT

A container holder having a shelf slidingly disposed in a housing, the shelf having a container holder. The shelf preferably is mounted so that it can both slide in and out of the housing and rotate about an axis other than the central axis of the housing. In one embodiment, two shelves are mounted one over the other in a single housing such that the shelves rotate away from each other when moved out of the housing. In another embodiment, two shelves are mounted side by side in a single housing.

16 Claims, 3 Drawing Sheets

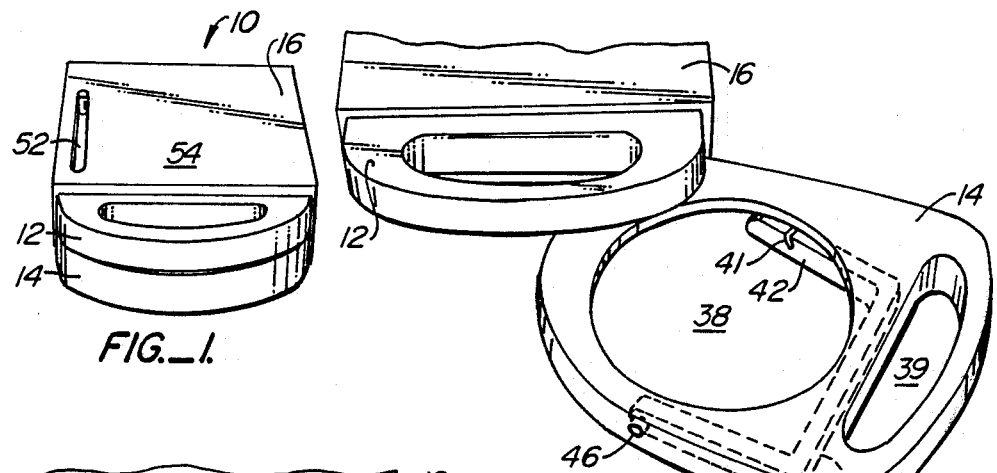
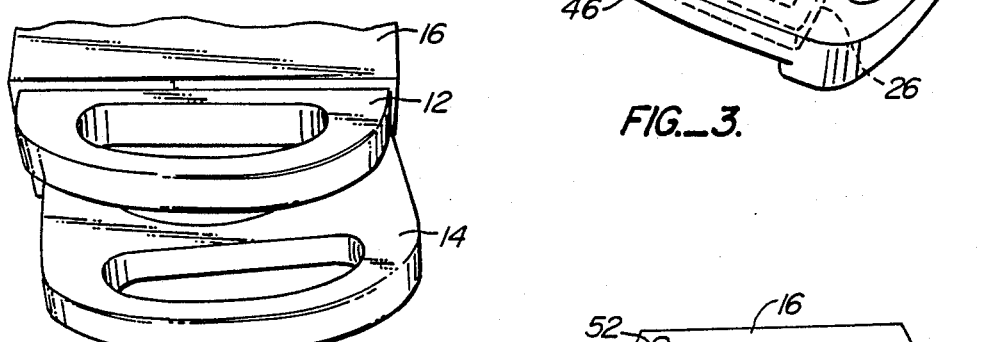
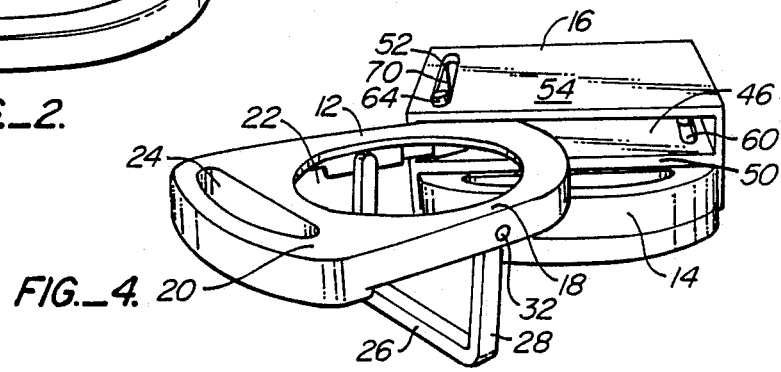
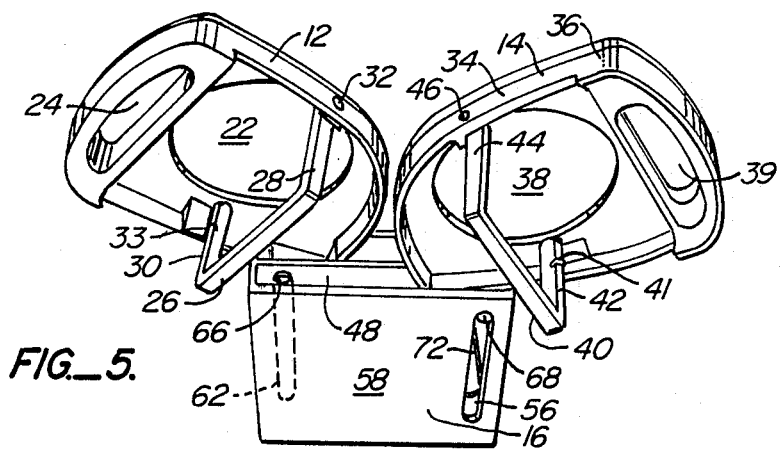

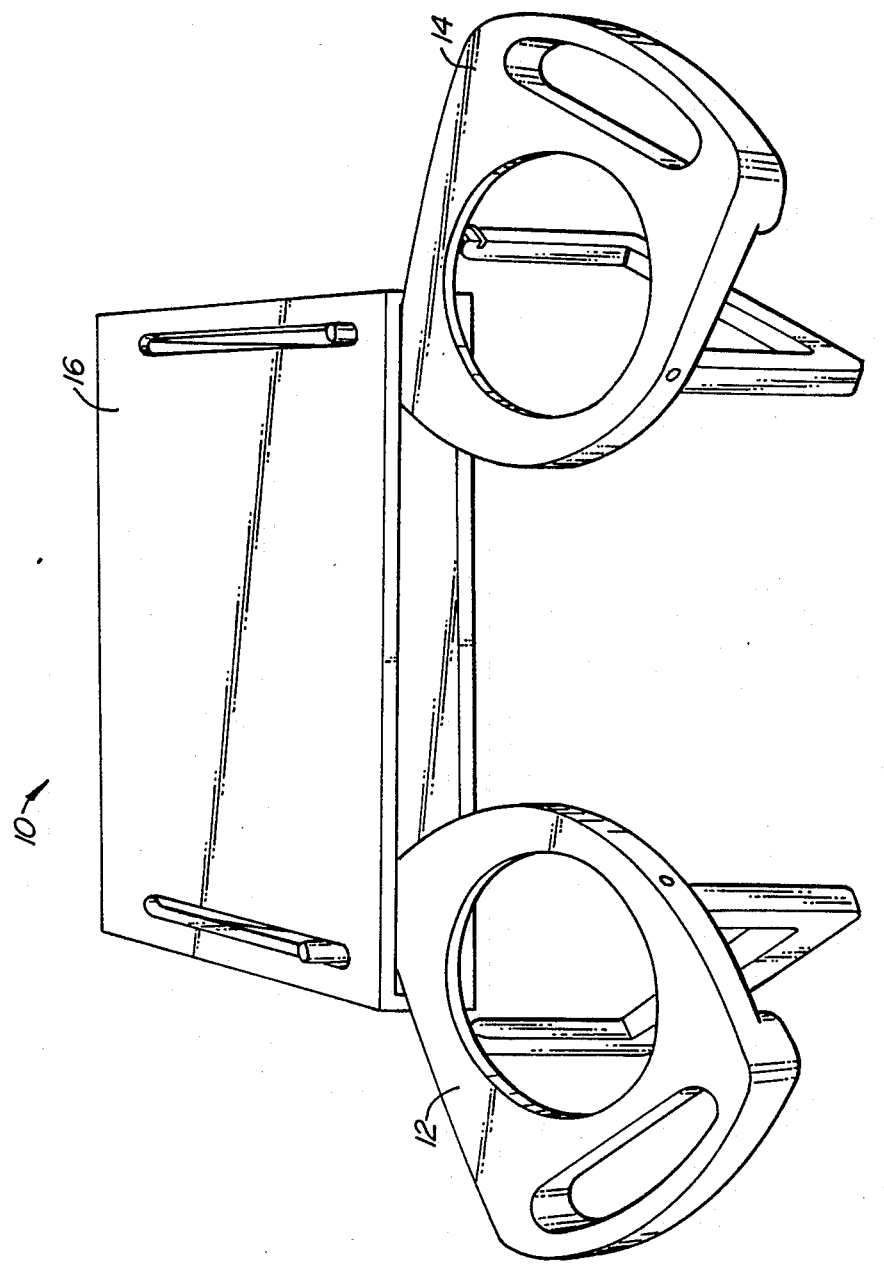
FIG._6.

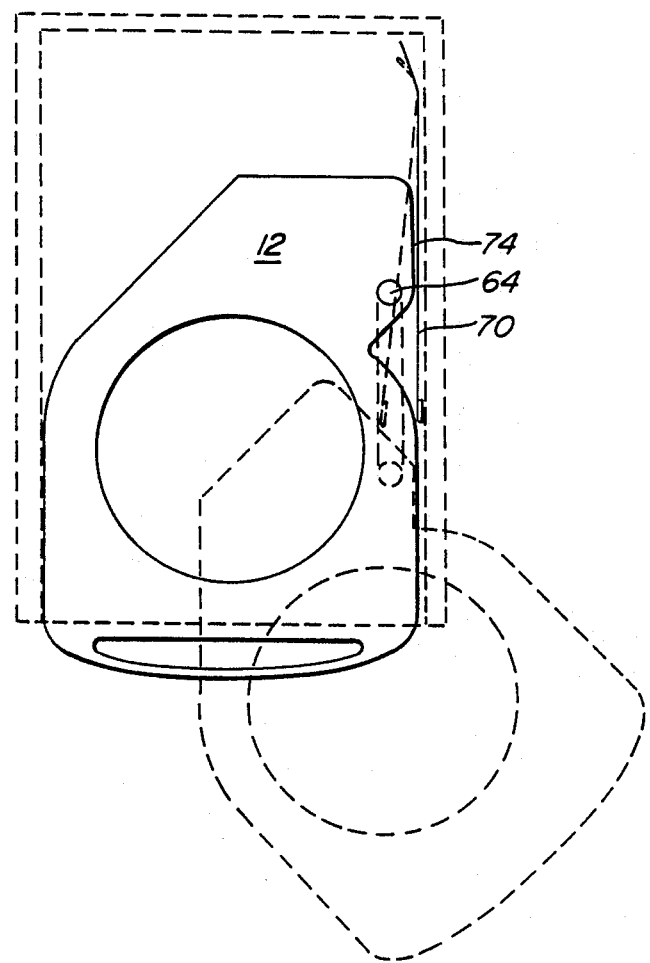
FIG._7.

4,955,571

DUAL ACTION CUPHOLDER

BACKGROUND OF THE INVENTION

This invention relates to beverage container holders generally and, in particular, to beverage container holders which may be moved from a concealed, inoperative storage position to an operative position.

Concealable container holders are known in the art. They are particularly useful in motor vehicles, where space is at a premium. When not in use, the container holder may be stored in a dash board or arm rest, thereby freeing the space occupied by the container holder. Because available storage space for the container holder is limited, the container holder must have a compact storage shape. Minimizing the storage size of container holders is particularly important when the unit is designed to hold multiple containers.

U.S. Pat. No. 2,526,793 discloses a shelf which pivots from an inoperative position concealed within the edge of a table to an operative position. The shelf has a ring which may be extended above and parallel to the top surface of the shelf to support a beverage container on the shelf. The disclosure of this reference is incorporated herein by reference.

U.S. Pat. No. 4,583,707 shows in FIGS. 4 and 5 a beverage container holder mounted on a shelf which pivots down from a storage housing. When the shelf is swung into its open position, the container holder may be moved from its endwise, inoperative position to a horizontal operative position. The disclosure of this reference is incorporated herein by reference.

U.S. Pat. No. 4,733,908 shows in FIGS. 1–6 a beverage container holder which is mounted on a shelf which pivots down from a storage housing. After the shelf has been moved to its open position, the two semicircular halves of the container holder may be separated from their vertical position to an open, horizontal position so that the semicircles form a ring. FIGS. 7–11 show an alternative embodiment having multiple container holders. The disclosure of this reference is incorporated herein by reference.

U.S. Pat. No. 4,826,058 shows two embodiments of a single container holder. In the embodiment of FIGS. 1 and 2, the holder swings out of its storage housing about a pivot mounted on one end of a front panel. In the embodiment of FIGS. 3–5, the holder slides out of the storage housing as a drawer. In both embodiments, a container support swings down into an operative position beneath the holder when the holder is removed from the storage housing. The disclosure of this reference is incorporated herein by reference.

SUMMARY OF THE INVENTION

This invention is a dual-action concealable container holder which slides out like a drawer and pivots like a swing-out shelf. In the preferred embodiment, the shelf is mounted so that it can both slide in and out of the housing and rotate about an axis other than the central axis of the housing. In one embodiment, two shelves are mounted one over the other in a single housing such that the shelves rotate away from each other when moved out of the housing. In another embodiment, two shelves are mounted side by side in a single housing.

The invention will be described more particularly with reference to the drawings.

BRIEF DESCRIPTION OF THE DRAWINGS

FIG. 1 is an elevational view of the preferred embodiment with both shelves in an inoperative position.

FIG. 2 is an elevational view of the preferred embodiment with one of the shelves partially withdrawn from the housing.

FIG. 3 is an elevational view of the preferred embodiment with one of the shelves in an inoperative position and one of the shelves in an extended position but with the support member in an unextended position.

FIG. 4 is an elevational view of the preferred embodiment with one of the shelves in an inoperative position and one of the shelves in an operative position.

FIG. 5 is an elevational view of the preferred embodiment with both shelves in operative positions.

FIG. 6 is an elevational view of an alternative embodiment with both shelves in operative positions.

FIG. 7 is an elevational view of one of the shelves.

DETAILED DESCRIPTION OF THE PREFERRED EMBODIMENT

The preferred embodiment of this invention is shown in FIGS. 1–5. The container holder unit 10 has upper and lower shelves 12 and 14, respectively, both mounted in a housing 16. As shown in FIGS. 4 and 5, shelf 12 has a container holder portion 18 and a handle portion 20. A substantially circular container aperture 22 is formed in the container holder portion 18 and a handle aperture 24 is formed in the handle portion 20. The shape of shelf 12 is shown more particularly in FIG. 7.

A support 26 is disposed below aperture 22. In the preferred embodiment, support 26 has arms 28 and 30 which attach to the container holder portion 18 of shelf 12 across a diameter of aperture 22. Pin 32 and an oppositely disposed pin (not shown) provide a hinged connection between support arms 28 and 30 and shelf 12. A torsional spring 33 extends support 26 when shelf 12 is withdrawn from housing 16. One arm of spring 33 rests against shelf 12, and the other rests against leg 30. When in the extended position shown in FIGS. 4 and 5, support 26 and container aperture 22 interact to support in a substantially upright position a container placed in aperture 22.

Lower shelf 14 is the mirror image of upper shelf 12 and has the following elements: a container holder portion 34; a handle portion 36; a substantially circular container aperture 38 formed in the shelf's container holder portion 34 and a handle aperture 39 formed in the handle portion 36; a support 40 disposed below aperture 38; and a torsional spring 41 between shelf 14 and support 40. In the preferred embodiment, support 40 has arms 42 and 44 which attach to the container holder portion 34 of shelf 14 across a diameter of aperture 38. Pin 46 and an oppositely disposed pin (not shown) provide a hinged connection between support arms 42 and 44 and shelf 14. When in its extended position as shown in FIG. 5, support 40 and container aperture 38 interact to support in a substantially upright position a container placed in aperture 38.

As shown in FIGS. 4 and 5, housing 16 is separated into upper and lower compartments 46 and 48 by a partition 50. A groove 52 is formed in the top surface 54 of housing 16, and a groove 56 is formed in the bottom surface 58 of housing 16. Two grooves are formed in partition 50, a groove 60 substantially below groove 52 and a groove 62 substantially above groove 56. Grooves 52 and 62 slidingly receive pins 64 and 66 projecting from upper shelf 12, and grooves 56 and 60 slidingly receive pin 68 and another pin (not shown) projecting from lower shelf 14.

Springs 70 and 72 are disposed in the housing adjacent grooves 52 and 56, respectively. Spring 70 presses against surface 74 of shelf 12 to rotate the shelf outward from the housing's centerline when the shelf is withdrawn from the housing far enough that pin 64 is forward of the end of spring 70. Spring 72 operates against a corresponding surface of shelf 14. In the preferred embodiment, springs 70 and 72 are formed from flat spring steel.

In operation, a user may move upper shelf 12 from its inoperative position as shown in FIG. 1 to an operative position as shown in FIG. 4 by grasping handle portion 20 and pulling the shelf out of the housing. Pins 64 and 66 slide in grooves 52 and 62 from the back of housing 16 to the front of housing 16. As it moves forward, shelf 12 rotates outward about pins 64 and 66 away from the centerline of housing 16 through the action of spring 70. Support 26 extends from its inoperative storage position as shown in FIG. 3 to an operative position as shown in FIGS. 4 and 5.

Shelf 12 may be stored in housing 16 by sliding pins 64 and 66 in grooves 52 and 62 from the front of the housing to the back. Support 26 moves from its extended, operative position to its inoperative storage position as shelf 12 enters compartment 46.

Likewise, the user may move lower shelf 14 from its inoperative position as shown in FIG. 1 to an operative position as shown in FIG. 5 by grasping handle portion 36 and pulling the shelf out of the housing. Pin 68 and the other pin slide in grooves 56 and 60 from the back of housing 16 to the front of housing 16. As it moves forward, shelf 14 rotates outward about pin 68 and the other pin away from the centerline of housing 16. The outward rotation of shelves 12 and 14 permit the shelves to be used simultaneously as container holders without interfering with each other.

Shelf 14 may be stored in housing 16 by sliding the pins in grooves 56 and 60 from the front of the housing to the back. Support 40 moves from its extended, operative position to its inoperative storage position as shelf 14 enters compartment 48.

An alternative embodiment of this invention is shown in FIG. 6. Instead of being disposed in housing 16 one above the other, shelves 12 and 14 are disposed side by side. The sliding and rotating operation of the shelves, however, remains the same.

The entire container holder unit 10 is preferably formed from injection molded plastic, although other materials may be used instead. In addition, while the preferred and alternative embodiments of this invention have two container holder shelves, the unit may be made with one shelf.

Other modifications of this invention will be apparent to those skilled in the art.

What is claimed is:

1. A container holder comprising:
    a housing having a top surface and a bottom surface and a front and a back; and
    a first shelf having holder means for supporting a container disposed therein, the holder means having a central axis, the shelf further having means for movably mounting the shelf within the housing, the means for movably mounting comprising
    sliding mount means for permitting the shelf to move axially from a first position substantially at the back of the housing to a second position substantially at the front of the housing, and pivoting mount means for permitting the shelf to rotate about an axis other than the holder means central axis.

2. The container holder of claim 1 wherein the sliding mount means comprises a pin extending from, the shelf, the pin interacting with an axially extending groove in the housing.

3. The container holder of claim 1 wherein the pivoting mount means comprises a pin extending from the shelf, the pin being spaced from the central axis of the holder means.

4. The container holder of claim 3 wherein the pin also serves as the sliding mount means, the pin interacting with an axially extending groove in the housing to permit movement of the shelf from the first position to the second position.

5. The container holder of claim 1 further comprising a second shelf having holder means for supporting a container disposed therein, the holder means having a central axis, the second shelf further having means for movably mounting the second shelf within the housing, the means for movably mounting comprising
    sliding mount means for permitting the second shelf to move axially from a first position substantially at the back of the housing to a second position substantially at the front of the housing, and
    pivoting mount means for permitting the second shelf to rotate about an axis other than the holder means central axis.

6. The container holder of claim 5 wherein the pivoting mount axis of the first shelf is closer to a first side of the housing than to a second side of the housing, and the pivoting mount axis of the second shelf is closer to the second side of the housing than to the first side, so that the two shelves may be swung away from each other when moved about their pivoting mount axes.

7. The container holder of claim 5 wherein the first shelf is disposed substantially above the second shelf.

8. The container holder of claim 1 further comprising means for grasping the shelf.

9. The container holder of claim 8 wherein the means for grasping is a handle attached to the shelf and extending forward of the front of the housing when the shelf is in its first position.

10. The container holder of claim 1 wherein the holder means comprises an aperture formed in the shelf and a support extending below the aperture when the shelf is in its second position.

11. The container holder of claim 10 wherein the support moves to an inoperative position when the shelf is moved to its first position.

12. A container holder comprising:
    a housing having a top surface and a bottom surface and a front and a back;
    a first shelf having holder means for supporting a container disposed therein, the holder means having a central axis, the shelf further having means for movably mounting the shelf within the housing, the means for movably mounting comprising
    sliding mount means for permitting the shelf to move axially from a first position substantially at the back of the housing to a second position substantially at the front of the housing, and pivoting mount means for permitting the shelf to rotate about an axis other than the holder means central axis. the sliding mount means and the pivoting mount means both comprising a single pin extending from the first shelf; and a second shelf having holder means for supporting a container disposed therein, the holder means having a central axis, the second shelf further having means for movably mounting the second shelf within the housing, the means for movably mounting comprising sliding mount means for permitting the second shelf to move axially from a first position substantially at the back of the housing to a second position substantially at the front of the housing, and pivoting mount means for permitting the second shelf to rotate about an axis other than the holder means central axis, the sliding mount means and the pivoting mount means both comprising a single pin extending from the second shelf.

13. The container holder of claim 12 further comprising a divider separating the housing into first and second compartments, the first shelf being mounted in the first compartment and the second shelf being mounted in the second compartment.

14. The container holder of claim 13 wherein the sliding mount means of the first shelf further comprises grooves formed in the top of the housing and in the divider and the sliding mount means of the second shelf further comprises grooves formed in the bottom of the housing and in the divider.

15. The container holder of claim 12 wherein the pivoting mount axis of the first shelf is closer to a first side of the housing than to a second side of the housing, and the pivoting mount axis of the second shelf is closer to the second side of the housing than to the first side, so that the two shelves may be swung away from each other when moved about their pivoting mount axes.

16. The container holder of claim 12 wherein the first shelf is disposed substantially above the second shelf.

* * * * *